Dec. 8, 1964  H. G. FARLEY  3,160,836
ELECTROHYDRAULIC ACTUATOR
Filed July 1, 1960  2 Sheets-Sheet 1
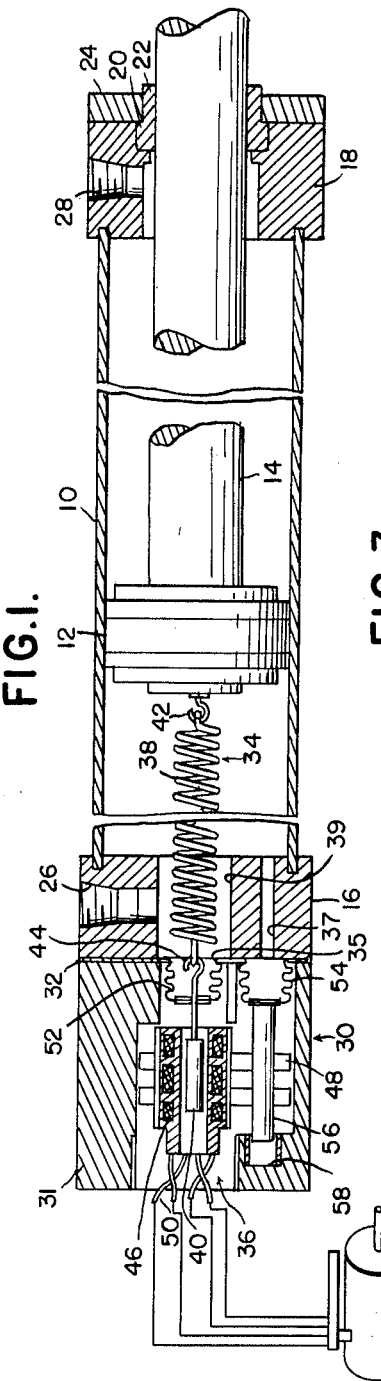
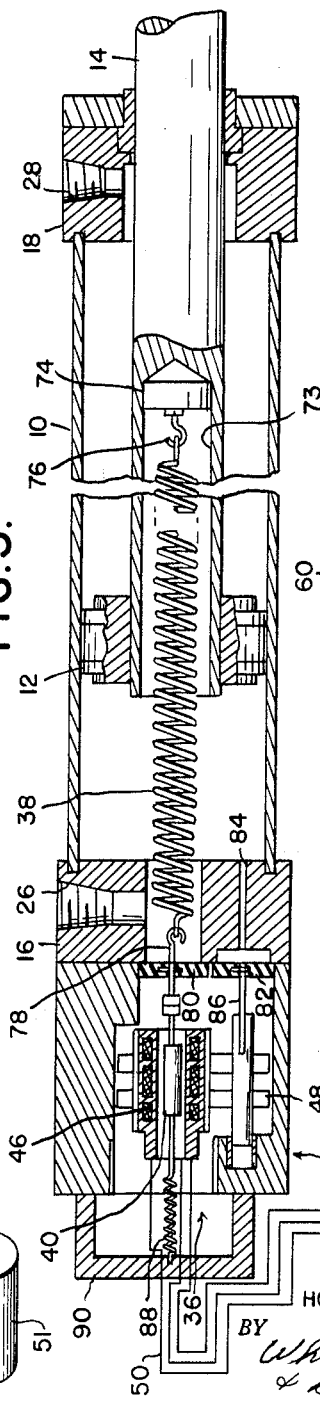
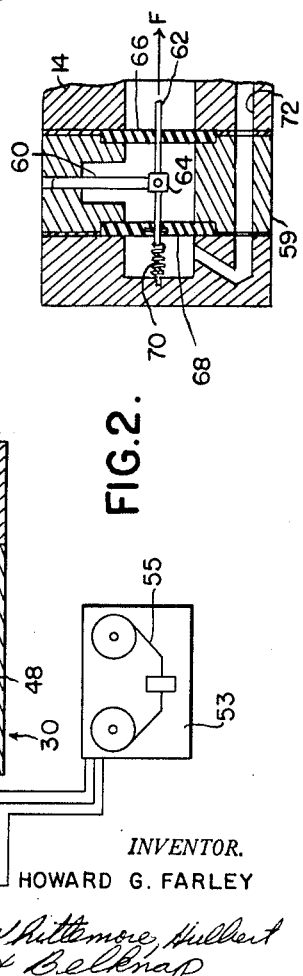
INVENTOR.
HOWARD G. FARLEY
BY
Whittemore, Hulbert
& Belknap
ATTORNEYS Dec. 8, 1964
H. G. FARLEY
3,160,836
ELECTROHYDRAULIC ACTUATOR
Filed July 1, 1960
2 Sheets-Sheet 2
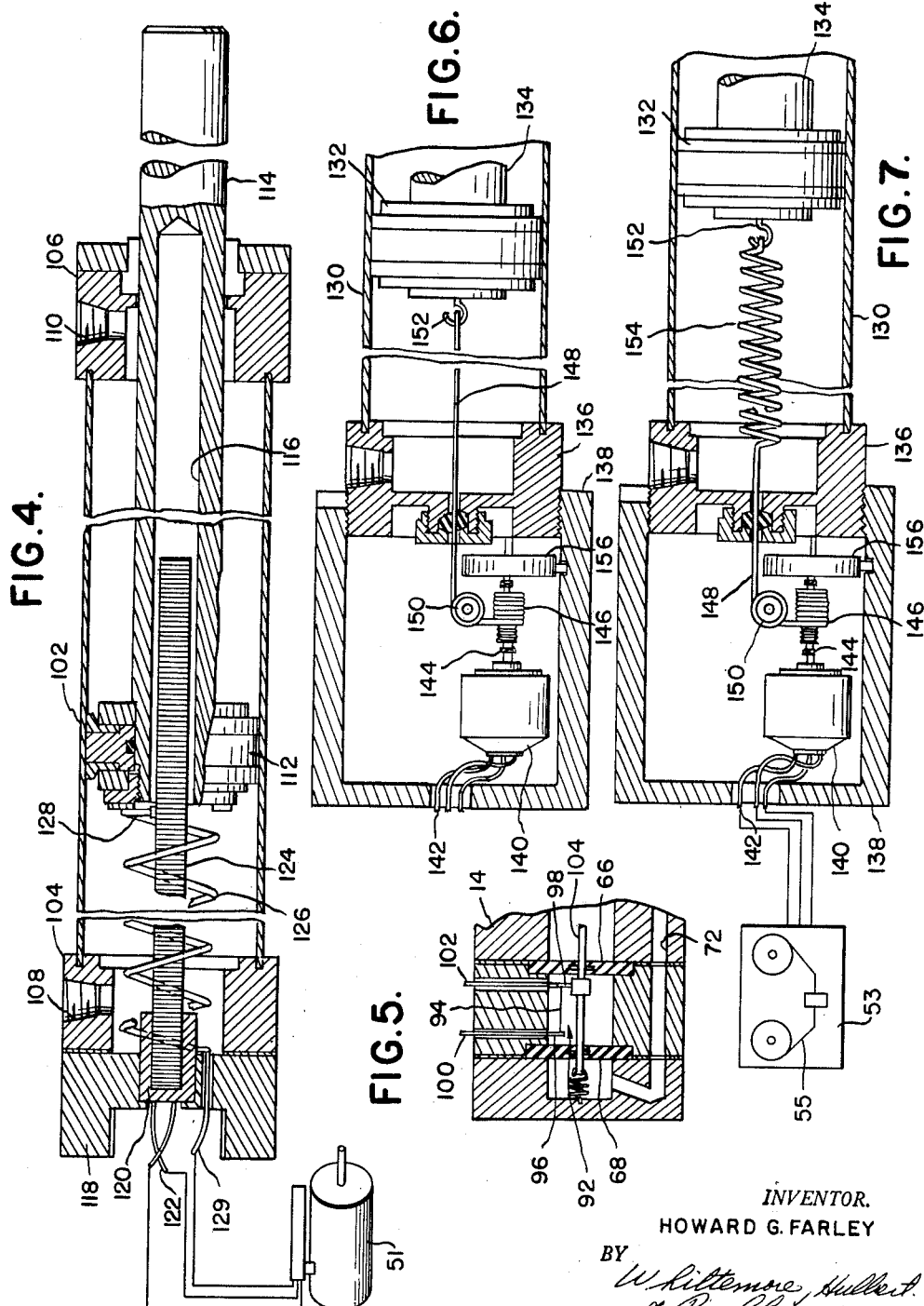
INVENTOR.
HOWARD G. FARLEY
BY
ATTORNEYS

United States Patent Office 3,160,836
Patented Dec. 8, 1964

3,160,836
ELECTROHYDRAULIC ACTUATOR
Howard G. Farley, Detroit, Mich., assignor to Guerin Engineering Inc., Ferndale, Mich., a corporation of Michigan
Filed July 1, 1960, Ser. No. 40,283
25 Claims. (Cl. 336—30)

This invention relates to electrically reproducing and recording the relative motion of a piston or the like and a cylinder, which motion produces a variable voltage or amperage output.

Still further, this invention relates to an electrical hydraulic device which includes a cylinder member, a piston member movable in and relative to the cylinder member and an electromechanical transducer for reproducing the relative displacement between the cylinder and piston members. This invention is to be carried out independently of the pressure of fluid acting in the cylinder member. Means are provided for compensating for the pressure of fluid so that the transducer will accurately convert the displacement of the piston member into electrical energy change.

The invention further relates to a cylinder having a piston movable therein. A transducer consisting of a mechanical linkage and an electromechanical converter or pickup is associated with the cylinder and piston so that the mechanical energy change due to the displacement of the piston relative to the cylinder may be converted into electrical energy change or vice versa. The invention is characterized by its unique arrangement which provides a simplified, low-cost structure having certain advantages contributing to efficiency, reliability and long life as well as ease of maintenance.

It is within the contemplation of this invention that the invention may be used in many different applications. One example of the application is in conjunction with an industrial type of furnace wherein it is desirable to move the charge into the furnace a predetermined distance. In such a case, it is not easy to determine the position of the charge in the furnace due to the extreme heat and excessive temperature in the furnace. With the proposed application, the piston rod is connected to the movable charging mechanism of the furnace. The relative movement of the piston and the hydraulic cylinder will in turn produce a change in the mechanical energy of the mechanical linkage which is interposed between the piston and the electromechanical converter. The change in mechanical energy of the mechanical linkage will in turn produce a corresponding electrical energy change in the electromechanical converter. A meter is connected to the converter and calibrated to read in feet or inches so that a change in the electrical energy in the converter deflects the needle of the meter a predetermined distance. The meter would indicate the exact position of the charge in the furnace.

In addition, this invention is particularly characterized by its inherent versatility and high performance which makes it suitable for automation where the output of the pickup is fed to recorders, data-processing and analysis equipment, as well as automatic-process systems and permanently electrically recorded on tape. The tape in turn is utilized subsequently to obtain the exact sequence of mechanical motion from the actuating device, as is electrically recorded on the tape.

It is an object of the present invention to provide a cylinder and piston device which includes means for reproducing the relative motion between the piston and cylinder.

Another object of the present invention is to provide an actuating device which includes a cylinder member, a piston member movable in and relative to said cylinder member, and an electromechanical transducer for indicating the relative linear displacement between said members.

Still another object of the present invention is to provide a device comprising a cylinder member, a piston member movable in and relative to said cylinder member, and an electromechanical transducer for reproducing the relative displacement between the members, said transducer comprising a mechanical linkage connected to one of the members and an electromechanical pickup for converting the mechanical energy change of the linkage due to the relative displacement of the members into a corresponding change in the electrical energy output of the pickup.

A further object of the present invention is to provide a device comprising a cylinder member, a piston member in said cylinder member, and an electromechanical transducer for indicating the relative displacement between said members independent of the fluid pressure acting in said cylinder.

A still further object of the present invention is to provide, in combination, a hydraulic cylinder and piston device, an electromechanical transducer for reproducing the relative linear displacement between the cylinder and piston and means for compensating for the effects of the pressure of fluid in the cylinder on the transducer.

Another object of the present invention is to provide a simplified, low-cost structure of the aforementioned type having certain advantages contributing to efficiency, reliability and long life.

Other objects and features of the invention will become apparent as the description proceeds, especially when taken in conjunction with the accompanying drawings, illustrating a preferred embodiment of the invention, wherein:

FIGURE 1 is a sectional view of the preferred embodiment of the present invention.

FIGURE 2 is a sectional view of a modification of the device shown in FIGURE 1.

FIGURE 3 is a sectional view of another embodiment of the present invention.

FIGURE 4 is a sectional view of still another embodiment of the present invention.

FIGURE 5 is a sectional view of another type of electromechanical converter which may be utilized.

FIGURE 6 is a sectional view of another modification of the present invention utilizing a potentiometer as the electromechanical converter.

FIGURE 7 is a sectional view of a modification of the invention shown in FIGURE 6.

FIGURE 1 shows a cylinder 10 having a piston 12 and rod 14 movable therein. A pair of end plates 16 and 18 are provided at opposite ends of the cylinder 10. End plate 18 has an annular opening provided therein for receiving a bushing 22 through which the rod 14 extends. A locating member 24 is provided around the bushing 22 and abuts the outer side of the plate 18.

End plates 16 and 18 are provided with ports 26 and 28 respectively for supplying hydraulic fluid to opposite ends of the cylinder 10. The ports 26 and 28 are located in a closed hydraulic circuit.

An electromechanical transducer 30 is provided on one end of the cylinder 10 and has a housing 31 which is secured to the end plate 16. The housing 31 and end plate 16 are separated by a relatively thin wall member 32. In its simplest form, the transducer 30 consists of two essential components, namely, a mechanical linkage 34 and an electromechanical converter or pickup 36. In FIGURE 1, a coil spring 38 is utilized as the mechanical linkage 34. It should be kept in mind, however, that equivalent structures may be utilized in place of the coil spring 38, such as an elastic member, various resilient members, etc. The coil spring 38 is interposed between the large end of the piston 12 and the movable core 40 of the electromechanical pickup 36. The spring 38 extends through an opening 39 provided in the end plate 16 to connect the core or armature 40 and the piston 12. One end of the spring 38 is connected to a hook 42 provided on the large end of the piston 12 and the other end of the coil 38 is connected to a hook 44 which is connected to the core or armature 40.

The pickup 36 includes a plurality of coils 46 mounted in a movable frame 48 appropriately carried in the housing 31. The core 40 is movable inside of the coils 46, when it is displaced by the displacement of the coil spring 38, so as to produce an electrical energy change. The electromechanical pickup 36 operates on the basis of the energy transformation theory wherein the change in the mechanical energy of the coil spring 38 is converted into a corresponding electrical energy change. Lead wires 50 are provided so that the output of the pickup 36 may be measured, as an example, by a meter or magnetic memory drum 51 which is connected thereto. Such an arrangement permits the transducer 30 to reproduce the linear displacement of the piston 12 relative to the cylinder 10.

As previously mentioned, the cylinder 10 is located in a closed hydraulic circuit which contains the fluid ports 26 and 28. It is important that the transducer 30 reproduce the motion effected by the linear displacement of the piston 12 relative to the cylinder 10. This motion, therefore, should not be influenced in any manner by the effects of the fluid pressure within the cylinder.

A pressure compensating device is provided which eliminates the effects of the fluid pressure on the transducer 30. This device includes a pair of bellows 52 and 54 which are connected on one end thereof to the wall member 32. Bellows 52 is connected on the other end thereof to the stem of the core 40, while the other bellows 54 is connected to a piston 56 which extends through the frame 48 and is adapted to move in a cylinder 58 provided in the outer end of the transducer housing 31. The bellows 52 and 54 have the same identical areas. The fluid pressure acting in the piston end of the cylinder 10 will in turn act on the bellows 52 and 54 through an opening 35 in the relatively thin wall member 32 and passage 37 respectively so that linear movement of the core 40, due to the pressure on the bellows 52, will be balanced by a corresponding movement of the frame 48 because of the pressure of fluid acting on the bellows 54. Therefore, the recording on the meter or other indicating instrument will be dependent only upon the linear movement of the piston 12 relative to the cylinder 10 and will be independent of the fluid pressure in the cylinder 10.

FIGURE 2 shows another converter which may be utilized with the embodiment shown in FIGURE 1. The end plate 14 of cylinder 10 has a two-piece housing 59 connected thereto. A rectangular cantilever beam 60 is vertically carried in the housing 59 and has provided on the sides thereof strain gages, not shown, which are appropriately connected in a conventional manner to a meter. An arm 62 is provided perpendicular to the cantilever beam 60. The arm 62 is connected to the free end of the beam 60 by means of a pivot connection designated by the numeral 64. The arm 62 is fixedly connected to a pair of flexible diaphragms 66 and 68 which are located in the housing 59. An equalizing tension spring 70 is connected on one end to an inner wall of the housing 59 and on the other end is connected to the rod 62. The tension spring 70 provides a reactive force for balancing the rod 62.

The diaphragms 66 and 68 have equal and opposed areas. A passage 72 connects the piston end of the cylinder 10 with the outer wall of the diaphragm 68. The pressure in the cylinder 10 acts on the diaphragms 66 and 68 and results in forces being applied to the diaphragms in opposite directions to one another. Such an arrangement provides an effective pressure compensating device which permits the cantilever beam to deflect upon relative displacement of the piston and cylinder members and the strain of the beam 60 measured independently of the pressure of fluid acting in the cylinder 10.

FIGURE 3 is similar to the embodiment shown in FIGURE 1 and, when appropriate, the same numerical designations will be utilized. Cylinder 10 has end plates 16 and 18 provided at opposite ends thereof, said end plates having ports 26 and 28 respectively. The piston 12 which is movable in the cylinder 10 has the rod 14 connected thereto which has an elongated passage 73 therein. The passage 73 has a stop member 74 fixedly secured therein which has thereon a hook 76 which engages one end of the coil spring 38. The other end of the coil spring 38 engages a hook 78 which is connected to the stem of the movable core 40. The stem of the core 40 extends through a pressure compensating diaphragm 80 which is exposed to pressure in the piston end of the cylinder 10. A second diaphragm 82 which has an area equal to the area of diaphragm 80 is connected to the piston end of cylinder 10 by means of a passage 84. The diaphragm 82 is connected to the frame 48 by means of a rod 86. An equalizing tension spring 88 is connected on one end to the movable core 40 and on the opposite end to the head member 90 which is connected to the housing 31. The exposed areas of diaphragms 80 and 82 are the same. The fluid pressure acting in the piston end of the cylinder 10 will move the core 40 and the frame 48 an equal amount. The relative displacement of the piston member 12 and cylinder member 14 will produce a change in the mechanical energy of the spring 38 which in turn will produce a corresponding electrical energy change in the pickup 36. The electrical energy change will not be effected by the pressure of fluid in the cylinder 10. The embodiment shown in FIGURE 3 is the same as FIGURE 1 with the exception that the diaphragms 80 and 82 replaced the bellows 52 and 54 and an equalizing tension spring 88 was added to provide a reactive force for balancing the armature 40. In addition, the lead wires 50 are connected to a tape recorder 53 so as to permanently record the relative displacement between the piston 12 and cylinder 10 on tape 55. The coil spring 38 is mounted in the piston rod 14 and provides a unique construction which is required for long stroke cylinders.

FIGURE 5 shows an arrangement of a semi-conductor strain gage 92 which has a relatively thin piece of wire 94 approximately connected between pins 96 and 98. The ends of the wire 94 are connected to wire leads 100 and 102 which are attached to a meter, not shown. Pin 98 is connected to rod 104 which is fixedly carried by pressure compensating diaphragms 66 and 68 in the manner described for FIGURE 3. The rod 104 is connected to the piston member and is adapted to move upon relative displacement between the piston and cylinder members so as to vary the length of the wire 94. A change in length of the wire 94 varies the electrical characteristics thereof. The change in length of wire 94 is directly proportional to the linear displacement between the piston and cylinder members. The displacement is reproduced as a variable voltage or amperage output on the meter.

FIGURES 4, 6 and 7 utilize a potentiometer as the pickup for sensing the relative displacement between a piston member and a cylinder member.

FIGURE 4 shows a cylinder 102 which has a pair of end plates 104 and 106 provided with ports 108 and 110 respectively. Piston 112 has a rod 114 extending therefrom. The rod 104 has a hollow interior designated by the numeral 116. A housing 118 is connected to the end plate 104 and has an annular opening therein for receiving the frame 120.

A cylindrical mandrel or closely wound coil 124 has one end retained in the insulated frame 120 and the other end extending into the interior 116 of the piston rod 114. The coil 124 has a pair of leads 122 leading therefrom. A loosely coiled wire 126 around the coil 124 is connected to stylus 128 which acts as the electrical moving pickup of the bridge circuit. Stylus 128 is adapted to move with the piston 112 and traverse the coil 124. The other end of the wire 126 has wire lead 129 extending therefrom. The lead wires 122 and 129 are connected to the meter or drum 51.

In operation, as the piston member 112 and cylinder member 102 move relative to one another, the stylus 128 moves a corresponding amount on the coil 124, thereby producing a relative electrical energy change which is recorded on the drum 51.

FIGURES 6 and 7 are closely related and therefore, the same numerical designations will be utilized when appropriate. The cylinder 130 has a piston 132 and a rod 134 movable therein. The end plate 136 which is mounted on one end of the cylinder 130 has a housing 138 threadedly secured thereto. A rotary potentiometer 140 is provided in the housing 138 and has a set of lead wires 142 extending therefrom which are adapted to be connected to the recording device 53 as shown in FIGURE 7. The potentiometer 140 is of the conventional type and has a drive connection 144 with a drum reel 146 which has a wire cable 148 wound thereon. A pulley 150 is provided in the housing 138 around which the wire cable 148 is adapted to move so as to properly orient the cable with reference to the piston 132. The cable 148 moves over the pulley 150 and extends through the wall of the end plate 136. Appropriate packing is provided at the point where the cable 148 emerges from the plate 136 so as to prevent fluid in the piston end of the cylinder 130 from entering the housing 138.

A spiral spring 156 is provided in the housing 138 and is directly connected to the shaft of the drum reel 146. The spring 156 furnishes a retractive balance force on the wire cable 140 as the piston 132 telescopes within the cylinder 130.

In FIGURE 6, the cable 148 is connected directly to a hook 152 provided on the piston 132. FIGURE 7 has a tension spring 154 which connects the hook 152 with the free end of the wire cable 148. The tension spring 154 is utilized to reduce the length of travel of the cable 140. This also reduces the number of revolutions of the rotary potentiometer 140.

In operation, relative displacement between the cylinder 130 and piston 132 unwinds the cable 148 a corresponding amount. Simultaneously, the potentiometer 140 is excited with a voltage, the amount of cable travel determining the amplitude of output voltage.

There is thus provided a unique, compact, low cost and simplified device for reproducing the movement or displacement of a piston member relative to a cylinder member. In addition, means are provided in certain of the embodiments for compensating or correcting the effects of the pressure of fluid in the cylinder.

As has been previously mentioned, the invention is characterized by its inherent versatility which makes it suitable for automation. An example is that the device may be connected to a paint gun utilized in an automation system. Consider the many and varied operations required to paint the hood of an automobile. The paint gun is placed under the control of the piston and rod assembly. Movement of the piston moves the paint gun a corresponding distance. The piston movement is recorded by feeding the output to a tape recorder which makes a permanent record of the various movements required to paint the hood. When the tape is recording, the piston and rod assembly is manually moved in the cylinder without the use of hydraulics. The linear displacement of the piston will in turn produce a change in mechanical energy which will be recorded as an electrical energy change on the sensing tape. The final result is that a tape is produced which accurately recorded the plurality of movements required to paint the hood and which may subsequently be utilized to automatically paint other automobile hoods.

When it is desirable to utilize the recorded sensing tape, the tape is fed into a device which in turn controls the flow of hydraulic fluid from one cylinder port to the other. The electrical energy input is transformed into the mechanical energy output of the piston and rod assembly which directs the painting action. When the cylinder is under the direction of the tape, the electromechanical transducer serves the important function of reading and comparing the position of the piston with the master tape. Any difference or error controls a hydraulic control valve, which in turn directs fluid to the particular port so as to move the piston to the exact place it should be in the cylinder as determined by the tape.

The drawings and the foregoing specification constitute a description of power transmission in such full, clear, concise and exact terms as to enable any person skilled in the art to practice the invention, the scope of which is indicated by the appended claims.

What I claim as my invention is:

1. An integral electro-fluid device comprising a cylinder member, a piston member relatively movable in said cylinder member, a frame at one end of said cylinder member, a coil carried by said frame, an armature movable relative to said coil, and a coil spring connected directly between said movable armature and said movable piston member whereby the relative linear movement of said piston member in said cylinder member will produce a change in the mechanical energy of said spring, which change will in turn move said armature to produce an electrical energy change through said coil which is a function of the relative displacement between said members.

2. An integral electro-fluid device comprising a cylinder member, a piston member relatively movable in said cylinder member, a frame at one end of said cylinder member, a coil carried by said frame, an armature movable relative to said coil, resilient means interposed between said armature and said piston member whereby the relative linear movement of said piston member in said cylinder member will produce a change in the mechanical energy of said resilient means, which change will in turn move said armature to produce an electrical energy change through said coil which is a function of the relative displacement between said members, and means for eliminating the effects of the pressure of fluid in said cylinder member on said frame and armature.

3. An integral actuating device comprising a cylinder member, a piston member relatively movable in said cylinder member, a housing on one end of said cylinder member, a frame in said housing for carrying an electrical coil, an armature inside of said coil, a pair of flexible wall members, means connecting one of said wall members to said frame, means connecting the other of said wall members to said armature, said wall members being exposed to fluid pressure in said cylinder member so as to move said frame and armature an equal amount independently of the relative displacement between said piston and cylinder members, resilient means connected between said armature and said piston member whereby relative displacement between said piston and cylinder members will result in a change in the mechanical energy of said resilient means, which change will be converted by the relative movement between said armature and coil into an equivalent electrical energy change.

4. The structure defined in claim 3 wherein said pair of flexible wall members is in the form of a pair of bellows.

5. The structure defined in claim 3 wherein said pair of flexible wall members is in the form of a pair of diaphragms.

6. The structure defined in claim 3 wherein said resilient means is in the form of a coil spring.

7. The structure defined in claim 3 wherein a tension spring is connected to said armature opposite said resilient means to provide a reactive force balance on said armature.

8. The structure defined in claim 3 wherein said piston member includes a rod and said resilient means is connected on one end to said armature and on the other end to a mounting member located on the inner periphery of said rod.

9. An integral electro-fluid device comprising a cylinder member, a piston member relatively movable in said cylinder member, a frame at one end of said cylinder member, a coil carried by said frame, an armature movable relative to said coil, a coil spring connected directly between said movable armature and said movable piston member whereby the relative linear movement of said piston member in said cylinder member will produce a change in the mechanical energy of said spring, which change will in turn move said armature to produce an electrical energy change through said coil which is a function of the relative displacement between said members, and means for connecting said coil to a recording instrument to permanently electrically record the electrical energy change through said coil on tape caused by the mechanical energy change of said spring.

10. An integral actuating device comprising a cylinder member, a piston member relatively movable in said cylinder member, a housing on one end of said cylinder member, a frame in said housing for carrying an electrical coil, an armature inside of said coil, a pair of flexible wall members, means connecting one of said wall members to said frame, means connecting the other of said wall members to said armature, said wall members being exposed to fluid pressure in said cylinder member so as to move said frame and armature an equal amount independently of the relative displacement between said piston and cylinder members, resilient means connected between said armature and said piston member whereby relative displacement between said piston and cylinder members will result in a change in the mechanical energy of said resilient means, which change will be converted by the relative movement between said armature and coil into an equivalent electrical energy change, and means for connecting said coil to a recording instrument to permanently electrically record on tape the electrical energy change through said coil.

11. An integral electro-fluid actuator comprising a tubular housing member, a wall member in said housing member, one of said members being stationary and the other member being movable with respect thereto, a coil element, an armature element for said coil element, means connecting one of said elements to said one member, resilient means interposed between said other member and the other of said elements whereby the linear movement of said other member with respect to said one member will produce a change in the mechanical energy of said resilient means, which change will in turn move said other element with respect to said one element to produce an electrical energy change through said coil element which is a function of the relative displacement between said members, and means for eliminating the effects of the pressure of fluid in said tubular housing member on said armature element and said coil element.

12. The actuator defined in claim 11 wherein said one member is the wall member and the other element is the armature element.

13. The actuator defined in claim 11 wherein means is provided for connecting said coil element to a recording instrument to permanently electrically record on tape the electrical energy change through said coil element.

14. An electro-fluid actuator comprising a tubular housing member, a wall member in said housing member, one of said members being stationary and the other member being movable with respect thereto, an electromechanical transducer operatively connected to said members for indicating the relative displacement between said members, said transducer including resilient means connected to said other member and an electromechanical pickup connected to said one member and to said resilient means, said pickup being effective to convert the mechanical energy change of said resilient means due to the relative displacement of said member into an equivalent electrical energy change, and means for eliminating the effects of the pressure of fluid in said tubular housing member on said electromechanical pickup.

15. An actuator defined in claim 14 wherein means is provided for connecting said pickup to a recording instrument to permanently electrically record the electrical energy change through said pickup on tape.

16. An actuator defined in claim 14 wherein said pickup is in the form of a potentiometer.

17. The structure defined in claim 10 wherein said pair of flexible wall members is a pair of bellows.

18. An electro-fluid actuator comprising a tubular housing member, a wall member in said housing member, one of said members being stationary and the other member being movable with respect thereto, an electromechanical transducer operatively connected to said members for indicating the relative displacement between said members, said transducer including resilient means connected to said other member and an electromechanical pickup connected to said one member and to said resilient means, said pickup comprising a coil and an armature and being effective to convert the mechanical energy change of said resilient means due to the relative displacement of said member into an equivalent electrical energy change.

19. An electro-fluid actuator comprising a tubular housing member, a wall member in said housing member, one of said members being stationary and the other member being movable with respect thereto, a coil element, an armature element for said coil element, one of said elements being substantially stationary and the other element being relatively movable with respect thereto, means operatively connecting said stationary element to said stationary member, and resilient means connecting said movable member to said movable element, means for limiting the movement of said movable element in opposite directions to prevent complete separation of said elements by said resilient means, the linear movement of said movable member with respect to said stationary member producing a change in the mechanical energy of said resilient means, which change will in turn move said movable element with respect to said stationary element against said limiting means to produce an electrical energy change through said coil element which is a function of the relative displacement between said members.

20. The structure defined in claim 19 wherein said limiting means includes a flexible wall mounted in said housing member.

21. The structure defined in claim 19 wherein means is provided for eliminating the effects of the pressure of fluid in said tubular housing member on said armature element and said coil element.

22. The structure defined in claim 19 wherein means is provided for connecting said coil element to a recording instrument to permanently electrically record on tape the electrical energy change through said coil element.

23. The structure defined in claim 20 wherein said flexible wall is in the form of a bellows.

24. The structure defined in claim 20 wherein said flexible wall is in the form of a diaphragm.

25. An actuator defined in claim 14 wherein said pick-up comprises a coil and an armature.

References Cited in the file of this patent
UNITED STATES PATENTS

| | | |
|---|---|---|
| 2,069,959 | Kuljian | Feb. 9, 1937 |
| 2,644,427 | Sedgfield et al. | July 7, 1953 |
| 2,755,966 | Lindars | July 24, 1956 |
| 2,922,971 | Jeglum | Jan. 26, 1960 |
| 2,939,283 | Ashton | June 7, 1960 |